Feb. 7, 1928.
G. E. SWARTZ
1,658,748
DRILL JIG
Filed July 21, 1926 3 Sheets-Sheet 1
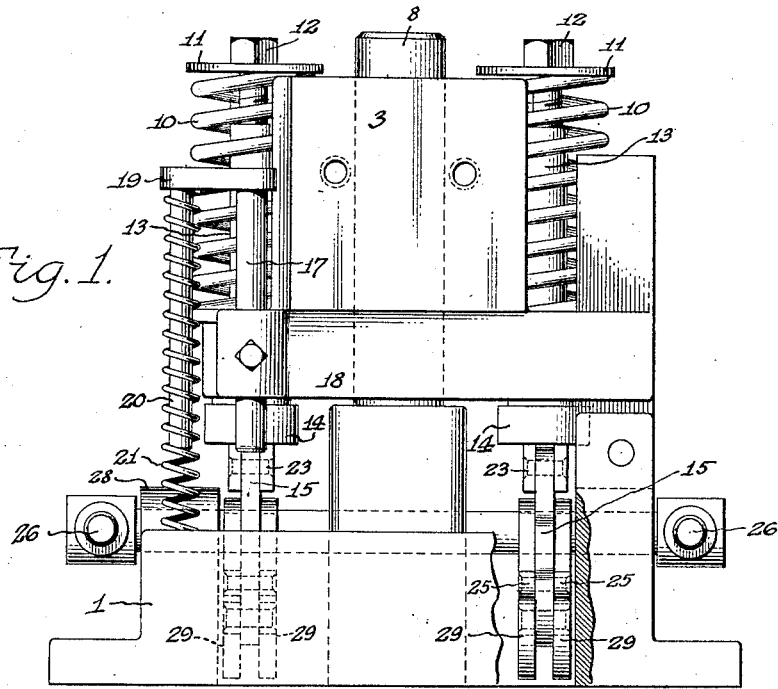
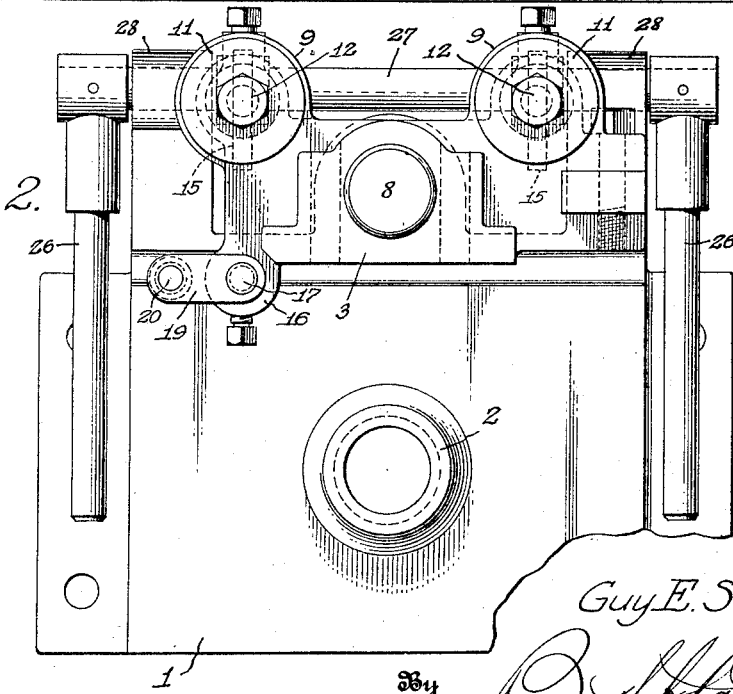
Inventor
Guy E. Swartz,
By
Attorneys Feb. 7, 1928.
G. E. SWARTZ
1,658,748
DRILL JIG
Filed July 21, 1926
3 Sheets-Sheet 2
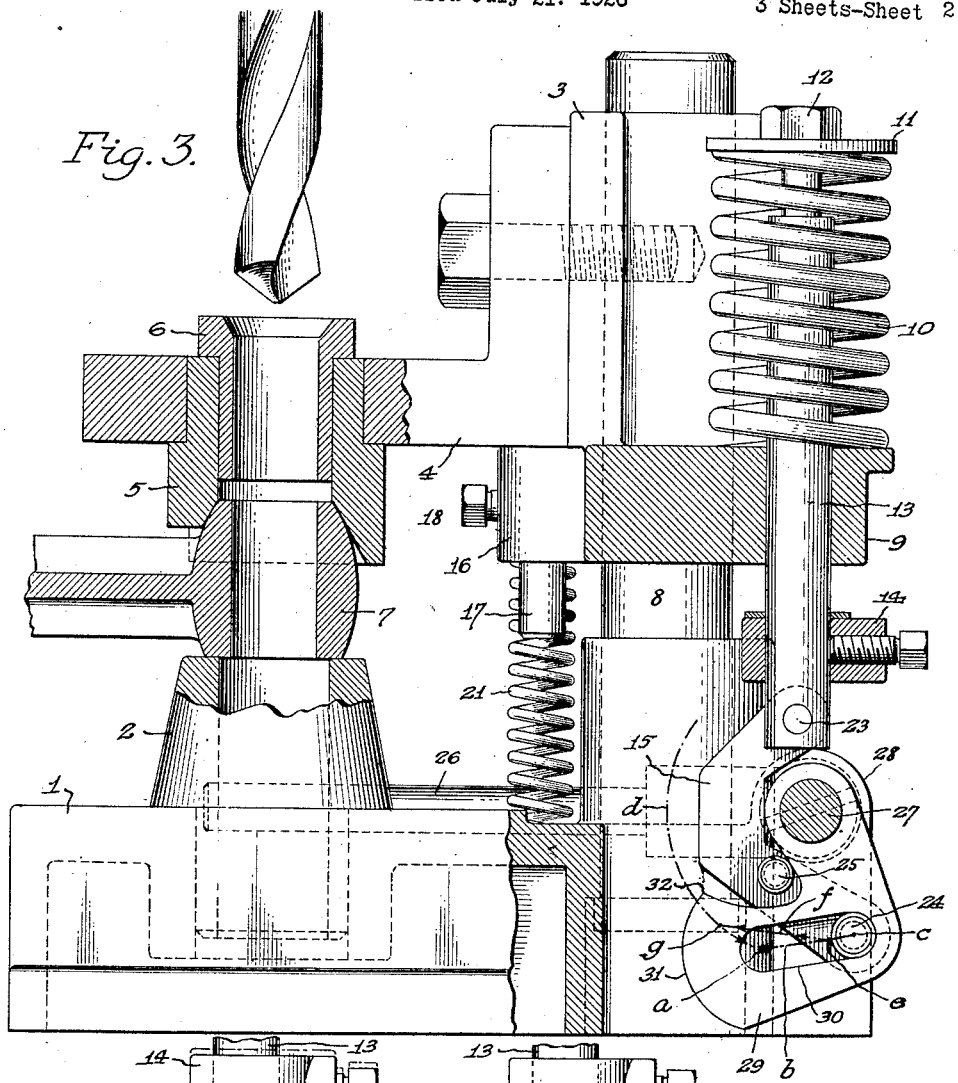
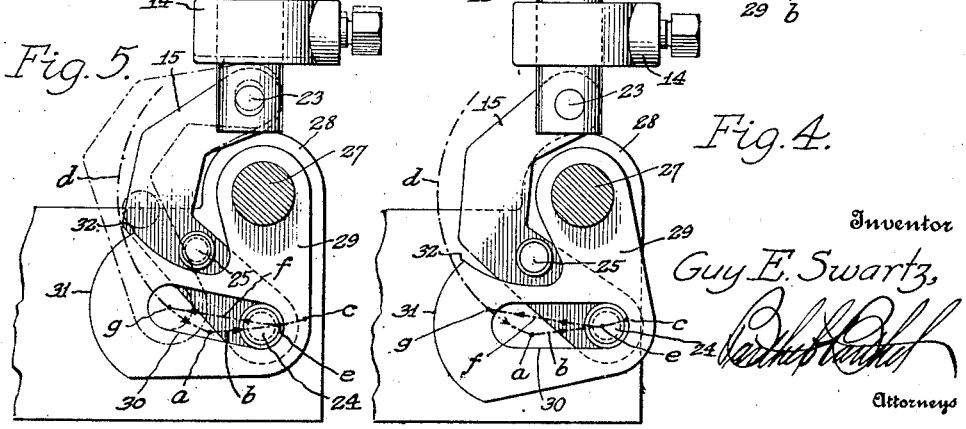
Inventor
Guy E. Swartz,
Attorneys Patented Feb. 7, 1928.

1,658,748

UNITED STATES PATENT OFFICE.

GUY E. SWARTZ, OF REDFORD, MICHIGAN.

DRILL JIG.

Application filed July 21, 1926. Serial No. 123,965.

This invention relates to drill jigs for the purpose of effecting the securing of work in a decided position during the drilling and other operations, such as of the type disclosed in Letters Patent No. 1,312,767, granted to me August 12, 1919, and has for its object to provide an improved form of such device wherein provision is made for facilitating the rapid release of the work when required so that production may be increased and loss of time in the opening and closing of the device reduced to a minimum.

The invention further aims to reduce the resistance offered by the clamping spring or springs against the closing of the device and to reduce the active movement or contraction of such clamping spring or springs.

A further object is to provide for the moving of the clamping spring or springs with one of the clamping members upon the opening of the device as distinguished from the movement of such clamping member against the resistance of its spring or springs throughout the greater part of the stroke of said clamping member.

A still further object is to provide a novel form of gear controlling the movement of the clamping member whereby the aforesaid objects are accomplished; and still further objects subsidiary to or resulting from the aforesaid objects, or from the construction or operation of the invention as it may be carried into effect, will become apparent as the said invention is hereinafter further disclosed.

In carrying the said invention into effect, I may provide above a base including a work holder or adapter, a vertically movable clamping member suitably guided and provided with a light lifting spring against the action of which it is depressible, and also with heavy clamping springs adapted to exert pressure thereon when the clamping member is closed upon work, together with operating mechanism in the form of a gear coupled to members bearing upon the upper ends of the clamping springs and adapted, when operated, to move or permit the movement of said clamping springs and the movable clamping member downwardly against the resistance of the lifting spring until the work is engaged by suitable means carried by said clamping member, whereupon the further operation of the said gear results in the compression of said clamping springs whereby said clamping springs then force the said clamp member firmly into engagement with the said work.

All of which is more particularly described and ascertained hereinafter, by way of example, having reference to the accompanying drawing, wherein—

Figure 1 is an elevation partly broken away of a drill jig embodying the said invention;

Figure 2 is a plan of the same, part of the base being broken away;

Figure 3 is a side elevation shown partly broken away and in section of the jig in its work holding position;

Figure 4 is a fragmentary detail view of the operating gear in a somewhat different position to that shown in Figure 3;

Figure 5 is a similar view to Figure 4, illustrating still another position of the parts.

Figure 6:
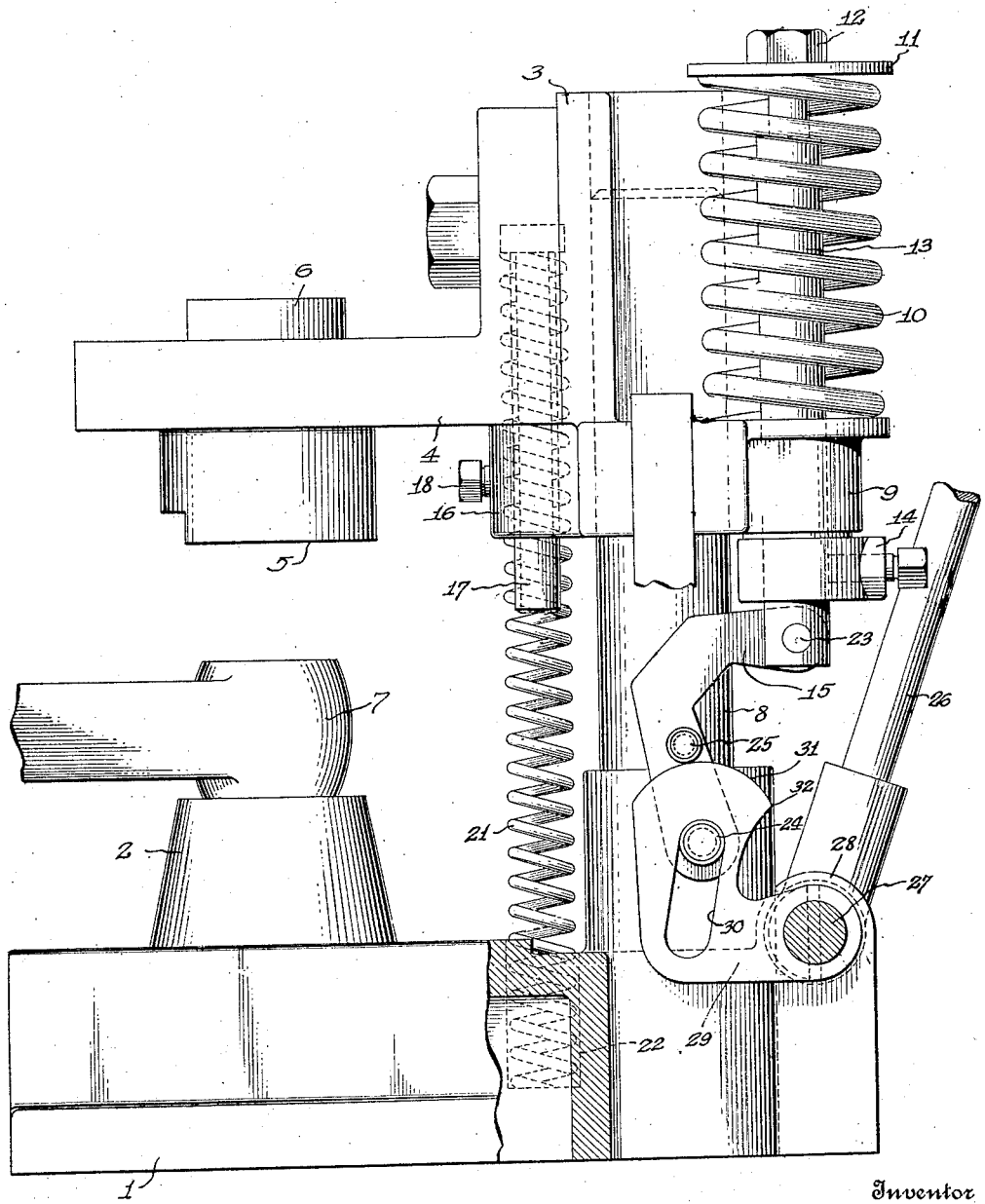
Figure 6 is a side elevation partly broken away, illustrating the jig in its open position.

Similar characters of reference indicate similar parts in the several figures of the drawings, and Figures 3 to 6 are drawn to a larger scale than are Figures 1 and 2.

The illustrated device is shown as having a base 1 provided with a work adapter 2 to suit the article which is to be clamped in the device and a vertically slidable clamping member 3 to the face of which is bolted an angle plate 4 carrying an adapter 5 which is usually provided with a bushing 6.

The members 4, 5 and 6 are omitted from Figures 1 and 2 for the sake of clarity of illustration, and the member 2 is also omitted from Figure 1 for the same reason. 7 indicates a connecting rod in connection with the machining of which the operation of the illustrated device is described.

The vertically movable clamping member 3 is slidably mounted upon a rod 8 extending upwardly from the said base 1 and is provided with ear pieces 9 upon which rest clamping or compression springs 10 surmounted by plates 11 attached by nuts 12 to the upper ends of rods 13 which slidably pass through the said ear pieces 9. These rods 13 are provided with adjustable stops 14 thereon, beneath the said ear pieces of the clamping member whereby the upward movement of the said rods, with respect to the said clamping member under the influence of the clamping springs, is limited, the lower ends of the said rods projecting beneath the said stops and being bifurcated for the hinged reception of links 15.

The said clamping member is also further provided with an ear piece or enlargement 16 in which is mounted a rod 17 adjustably secured by a set screw 18 and having at its upper end a cross piece 19 from which depends a further rod 20 forming a guide for a spring 21. The lower end of this spring 21 enters a socket 22 in the said base, and the upper end bears against the underside of the cross piece 19 whereby the said spring 21 effects a lifting exertion on the said clamping member. The said lifting spring is of decidedly lighter construction than the clamping springs 10 and is only intended to support or partially support the weight of the said clamping member and parts carried thereby; or it may be dispensed with as will become apparent.

The clamping of the work is intended to be effected by the pulling downward of the rods 13, which movement being transmitted through the spring 10 to the clamping member 3 will result in the downward movement of the said clamping member against the influence of the lifting spring 21 and without effecting compression of the said clamping springs until the work 7 is engaged by the adapter 5, whereupon the further downward movement of the said clamping member is arrested by such engagement. The continued downward movement of the said rods 13 simply results in the compression of the clamping springs 10 with the consequent exerting thereby of pressure upon the work, as desired in order to effect its being firmly gripped between the adapters 2 and 5, the extent of such pressure depending upon the resistance of the clamping springs 10 and the extent to which they are compressed after the work is engaged. Such compression of the said clamping springs does not necessarily need to be considerable where they offer sufficient resistance to accomplish the desired result with but little compression.

In order to effect these movements, I provide operating gear which includes the links 15 heretofore referred to, the upper ends of which are hingedly connected to the lower ends of the rods 13 by means of pintles 23, the said links in this instance being shown as of a bowed formation so that they may pass around certain of the parts of the gear when the device is in its closed position, as will become apparent, and they are provided with rollers 24 at their lower ends and with further rollers 25 intermediate of their ends, the purpose of which will now be explained.

26 are operating handles connected to opposite ends of a transversely disposed operating bar 27 journaled in lugs 28 on the rear end of the base of the device, and secured to the said operating bar are bell crank members 29, the outer arms of which are provided with slots 30 which accommodate the rollers 24 of the links 15.

It will be seen from an examination of Figure 3 of the drawings, that when the bell crank members are in the position which they occupy when the device is closed, the said slots 30 are inclined upwardly and rearwardly of the device and extend to a point rearward of the axes of the pintles 23; and it will be also apparent from an examination of Figure 5, that if the said bell crank members be swung forwardly by the lifting of the handles 26 to a comparatively slight extent, the inclination of the said slots is reversed.

The outer ends of the bell crank members are provided with arcuate surfaces 31, and in the open position of the device the rollers 25 rest upon these surfaces supporting the links 15 thereon and retaining the rollers 24 in the forward ends of the slots 30, so that as long as the said rollers 25 are in contact with the arcuate ends of the said bell crank members, no movement of the rollers 24 along the slots is permitted.

When the device is fully open, the handles are raised and as these handles are pulled towards the base 1 and depressed to effect the closing of the device, the bar 27 is rotated and effects the downward swinging of the bell crank members 29, which, by reason of the engagement of the rollers 24 in the ends of the slots 30, exert a downward pull on the rods 13 through the medium of the links 15 and cause the clamping member 3 to be moved downwardly until the work is engaged by the adapter 5, this movement being effected only against the resistance of the lifting spring 21 where such is provided.

Upon the arresting of the downward movement of the clamping member by the engagement of the adapter with the work, the continued depression of the operating handles results in the further downward movement of the rods 13 compressing the clamping springs 10 which then exert pressure upon the work as required.

As the movement of the bell crank member downwardly to effect this clamping operation takes place, the rollers 25 travel over the surface of the arcuate ends of the said bell crank members, until they pass the corners 32 of the said members and release the rollers 24 from positive locking in the forward ends of the slots 30 which condition existed until that time, and as the said bell crank members are still further swung until they pass rearwardly beyond the position shown in Figure 4, the said slots become inclined upwardly and rearwardly as shown in Figure 3. The centers of the rollers 24 are now rearward of the axes of the springs 10 as shown by the point $a$ in Figure 3 and are driven upwardly along the line $b$ under the influence of the clamping springs until they reach the point $c$ wherein they are arrested by engagement in the rear ends of the said slots as shown in the said Figure 3.

It is to be observed here that the upward drive of the rollers 24 is accomplished solely by the springs 10 without movement of the lever 26 and without effort applied thereto by the operator. The consequent action of the link 15 and the corresponding downward movement of the adapter 5, without displacement of the lever 26, obviously reduces the arc through which the lever must be drawn, and hence the operator saves considerable time in manipulating the lever 26.

In this position of the parts, the work is firmly clamped under the influence of the clamping springs, these springs also effecting a locking of the described operating gear in its closed position due to the upward pull of the clamping springs on the rollers 25 and the fact that the said rollers have then passed beyond the moment of the forces acting thereon.

In the said diagram the arc $d$ indicates the travel of the center of the rollers 25 throughout the greater part of the lifting or lowering operation.

When the operating handles are raised for the releasing of the work, the bell crank members are swung upwardly, in the course of their travel assuming the position Figure 4 wherein the slot is horizontal and the center of the rollers 24 approach the point $e$, and as the movement is continued the slot becomes inclined upwardly and forwardly as indicated in Figure 5, and the said rollers under the influence of the clamping springs travel upwardly through the slot along the line $f$ to the point $g$ whereby they again assume their position in the forward ends of the slots and act as pivots about which the links 15 swing as indicated by the broken outline in Figure 5. Consequently, as the further forward swinging of the bell crank members takes place the rollers 24 again pass over the arcuate ends of the said members and the continued movement of the members is practically without effort, the raising of the clamping member being effected or assisted by the lifting action of the spring 21.

As the clamping members and clamping springs move together as a unit except when the work is actually engaged by the adapter ease of operation is secured, and as the actual compression of the clamping springs may be slight they need only offer resistance to the motion of the bell crank members during the period approximating that wherein the slot reverses its inclination, the extent of the compression of the clamping springs however varying according to the dimensions of the work and relative spacing of the adapters.

The use of the lifting spring 21 is not absolutely essential as it will be obvious that in any case the stops 14 would effect the lifting of the clamping member, and the arcuate ends of the bell crank members the raising of the rods 13, when the operating handles are raised, but in the case of large machines having heavy parts such lifting spring has a desirable counterbalancing effect.

The described arrangement admits of the jig being operated without interference by the clamping springs, except when the work is actually engaged, and consequently reduces the energy required to open and close the device. In fact, the arrangement is such that once the partial movement of the operating handles has been effected to an extent resulting in the reversal of the inclination of the slots 30 the device is practically self-opening and rapid operation thereof is facilitated.

This invention may be developed within the scope of the following claims, without departing from the essential features of the said invention, and it is desired that the specification and drawing be read as merely illustrative and not in a limiting sense, except as necessitated by the prior art.

What I claim is:—

1. In a drill jig, fixed and movable clamping members, an actuating member pivotally mounted with reference to said fixed clamping member, a bell crank lever having one end fixed to said actuating member, a link having one end slidably connected to said bell crank lever, a rod connected to the other end of said link and passed slidably through said movable clamping member, and a spring anchored to said rod and bearing upon said movable clamping member, and a roller carried by said link and adapted to ride on the free end of the bell crank lever and into the angle of said lever.

2. In a drill jig, fixed and movable clamping members, an actuating member pivotally mounted with reference to said fixed clamping member, a bell crank lever having one end fixed to said actuating member, a link having one end slidably connected to said bell crank lever, a rod connected to the other end of said link and passed slidably through said movable clamping member, and a spring anchored to said rod and bearing upon said movable clamping member, said bell crank lever having an arcuate free end, and a roller carried by said link and adapted to ride on said free end and into the angle of said bell crank lever.

In testimony whereof I affix my signature.

GUY E. SWARTZ.